United States Patent
Luo et al.

(10) Patent No.: US 7,292,652 B2
(45) Date of Patent: Nov. 6, 2007

(54) SYMBOL DETECTING WITH LARGE FREQUENCY ERROR

(75) Inventors: Tao Luo, San Diego, CA (US);
Young-Chai Ko, San Diego, CA (US);
Gibong Jeong, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 702 days.

(21) Appl. No.: 10/690,032

(22) Filed: Oct. 21, 2003

(65) Prior Publication Data

US 2005/0084036 A1    Apr. 21, 2005

(51) Int. Cl.
*H03K 9/00* (2006.01)
(52) U.S. Cl. ...................................... 375/316
(58) Field of Classification Search ................ 375/316, 375/344, 345, 377, 224, 226; 455/182.1, 455/182.2, 192.1, 192.2, 192.3
See application file for complete search history.

(56) References Cited

U.S. PATENT DOCUMENTS

| 5,361,276 A * | 11/1994 | Subramanian ............... 375/150 |
| 6,650,912 B2 * | 11/2003 | Chen et al. .................. 455/574 |
| 6,963,602 B1 * | 11/2005 | Borowski et al. ........... 375/148 |
| 2003/0214937 A1 * | 11/2003 | Lindoff et al. ............... 370/350 |

* cited by examiner

*Primary Examiner*—Pankaj Kumar
(74) *Attorney, Agent, or Firm*—Dolly Y. Wu; W. James Brady; Frederick J. Telecky, Jr.

(57) ABSTRACT

System and method for detecting symbols wherein there may be a large frequency error. A preferred embodiment includes receiving an estimated frequency error, calculating a vector based on the estimated frequency error, buffering symbols from two symbol streams, rotating the symbols from the two symbol streams using the vector, estimating a channel gain for the symbols in the second symbol stream, and applying the channel gain to the rotated symbols from the second symbol stream.

28 Claims, 7 Drawing Sheets

SYMBOL DETECTING WITH LARGE FREQUENCY ERROR

TECHNICAL FIELD

The present invention relates generally to a system and method for digital communications, and more particularly to a system and method for detecting symbols wherein there may be a large frequency error.

BACKGROUND

In a battery powered wireless device, long battery life may perhaps be the single most important feature. To extend battery life, it is common to put the wireless device to sleep when it is not being used. However, to ensure that the user of the wireless device is not missing any incoming calls, pages, etc. that may be desirable, the wireless device must periodically wake up to check and see if it needs to process any incoming calls, pages, etc.

The wireless device would periodically wake up and detect and then decode a particular transmitted symbol, commonly referred to as a paging indicator, and then depending upon the value of the paging indicator, the wireless device could go back to sleep or continue processing information in order to receive an incoming call, page, etc. The frequency of the wireless device waking up to detect and then decode the paging indicator can be dependent upon the frequency of the paging indicator itself.

One potential source of concern involved with putting a wireless device to sleep and then waking it up may be that the internal clock of the wireless device may drift away from the system clock of the wireless communications system. This may be commonly referred to as frequency error. Clock drift may be the result of an internal clock in the wireless device not being able to keep time as accurately as the system clock. Significant clock drift may prevent the accurate detecting and decoding of the paging indicator.

A commonly used technique to help reduce the frequency error involves waking up the wireless device prior to the expected arrival time of the paging indicator and then using automatic frequency control (AFC) circuitry to reduce (or eliminate) any frequency error that may exist. Once the frequency error is reduced to acceptable levels, the paging indicator may then be accurately detected and decoded.

One disadvantage of the prior art is that the use of AFC circuitry may take a long amount of time to reduce the frequency error down to an acceptable level. While the AFC circuitry is operating, the power consumption can be large and the overall battery life of the wireless device may be shortened. Furthermore, when the AFC circuitry is running, a significant portion of the wireless device may be powered, hence adding to the power consumption. Therefore, it is desired to minimize the amount of time that the AFC circuitry (and hence the wireless device) is being powered.

A second disadvantage of the prior art is that with AFC circuitry, the operating rate of the AFC circuitry may be limited by the hardware. This means that the AFC circuitry may not be able to reduce the frequency error to an acceptable level within the allotted amount of time. This may require that the wireless device be woken up earlier, thus further reducing the battery life of the wireless device.

SUMMARY OF THE INVENTION

These and other problems are generally solved or circumvented, and technical advantages are generally achieved, by preferred embodiments of the present invention which provides for a system and method for detecting and decoding symbols in situations with the possibility of large frequency errors.

In accordance with a preferred embodiment of the present invention, a method for detecting a symbol comprising receiving an estimated frequency error, calculating a vector based on the estimated frequency error, rotating buffered symbols of a first and second type via the vector, estimating a channel gain for the buffered symbols of the second type, applying the channel gain to the rotated buffered symbols of the second type, and summing the results of the application is provided.

In accordance with another preferred embodiment of the present invention, a symbol detector comprising a first and a second symbol buffer coupled to a symbol input, a frequency error estimator (FES) unit coupled to the first and second buffers, the FES unit containing circuitry to compute a frequency error estimate from the symbols in the first and second buffers, a phase vector generator coupled to the FES unit, the phase vector generator containing circuitry to compute a phase rotation vector based on the frequency error estimate, a first phase error corrector coupled to the first symbol buffer and the phase vector generator, the first phase error corrector containing circuitry to rotate the symbols in the first symbol buffer, and a second phase error corrector coupled to the second symbol buffer and the phase vector generator, the second phase error corrector containing circuitry to rotate the symbols in the second symbol buffer, compute a channel gain for each symbol in the second symbol buffer, and apply the channel gain to the rotated symbols from the second symbol buffer is provided.

In accordance with another preferred embodiment of the present invention, a wireless device comprising a radio frequency (RF) signal input, a symbol detector coupled to the RF signal input, the symbol detector containing circuitry to calculate a frequency error estimate based upon symbols from the RF signal input and to correct frequency errors in symbols from the RF signal input using the calculated frequency error estimate via mathematical manipulations, and a combiner coupled to the symbol detector, the combiner containing circuitry to merge output from the symbol detector based on a weight assigned to the output is provided.

An advantage of a preferred embodiment of the present invention is that an estimate of the frequency error can be calculated after a short period of time. Therefore, the wireless device may be kept in sleep mode for a longer amount of time to enhance the battery life of the wireless device.

A further advantage of a preferred embodiment of the present invention is that the amount of time to correct a frequency error remains essentially the same, regardless of the magnitude of the frequency error. This can enable the wireless device to operate with a variety of frequency errors, making the wireless device more robust.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a third generation wireless communications device adherent to technical specifications provided by the $3^{rd}$ Generation Partnership Project (3GPP). An introduction to the technical specifications provided by the 3GPP may be found in a document entitled "$3^{rd}$ Generation Partnership Project; Technical Specifications Group Services and System Aspects General UMTS Architecture (Release 4)," published March 2004, which is herein incorporated by reference. The invention may also be applied, however, to other wireless communications systems which make use of the detecting and decoding of a periodically transmitted symbol to indicate the need to perform further processing to receive an incoming call, page, etc. These wireless communications systems may include CDMA2000, GSM (global system for mobile communications), CDMA (code-division multiple access) IS-95 and IS-98, and so forth.

Figure 1:
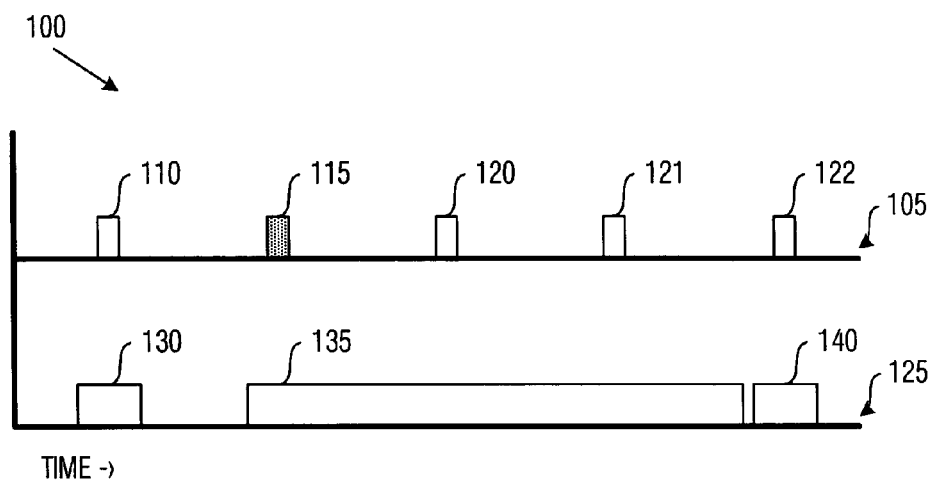
FIG. 1 is a diagram of a stream of paging indicator symbols and operations performed by a wireless device to detect and decode the paging indicators.

With reference now to FIG. 1, there is shown a diagram illustrating paging indicator symbols, such as a paging indicator symbol 110, and operations performed by a wireless device to detect and decode the paging indicator symbols. A first axis 105 displays a series of paging indicators, such as paging indicators 110 and 115, which can be periodic in nature. A second axis 125 displays a time-space diagram illustrating the operations performed by a wireless device in order to detect and decode the paging indicators.

The first axis 105 illustrates the periodic sequence of paging indicators (for example, paging indicators 110 and 115), which can be transmitted by a base station of a communications system. Each paging indicator may take on one of several values. For example, according to the 3GPP technical specifications, a paging indicator may have a value of +1 or −1, wherein one value tells the wireless device that there is no incoming call, page, etc. and it can go back to sleep while the other value tells the wireless device that it needs to begin processing data to handle an incoming call, page, etc. Note that in many communications systems, a transmission unit can be commonly referred to as a symbol and that the transmission of a single paging indicator may consist of transmitting multiple symbols. As illustrated in FIG. 1, the first axis 105 displays five paging indicators with first, third, fourth, and fifth paging indicators (shown as paging indicators 110, 120, 121, and 122), wherein the paging indicators may signify that there is no incoming call, page, etc. for the wireless device. The second paging indicator 115 possibly signifies that there is an incoming call, page, etc. for the wireless device.

The second axis 125 illustrates the processing performed by a wireless device to detect and decode the paging indicators in addition to any processing of data associated with an incoming call, page, etc. Prior to a time that corresponds to the expected arrival time of a paging indicator (such as the paging indicator 110), the wireless device wakes up and begins preparation for detecting the paging indicator 110. The time that the wireless device is in operation (for the processing of the paging indicator 110) is displayed as block 130. The operations of the wireless device may include turning on radio frequency equipment, starting to receive transmissions, performing any needed tuning and/or training, making corrections to any frequency errors, obtaining any multipath information, assigning rake receiver fingers to the various multipaths, and so forth. Once the paging indictor 110 is detected, it can be decoded. After decoding the paging indicator 110, the wireless device may (depending on the information in the paging indicator 110) go back to sleep or continue operation to process data needed to handle an incoming call, page, etc. In the case of the paging indicator 110, the wireless device may go back to sleep.

The wireless device may sleep until it is time to wake up to detect and decode a next paging indicator (in this case, the paging indicator 115). As above, the wireless device wakes up prior to a time that corresponds to the arrival of the paging indicator 115. The time that the wireless device is operating is displayed as block 135. Once the paging indicator 115 is decoded, the wireless device realizes that it has an incoming call, page, etc., so it continues with additional processing and operations to receive the incoming call, page, etc. The wireless device continues operations until the incoming call, page, etc. is complete and then goes back to sleep. The duration of the wireless device's operations may be longer than the time between paging indicators and the wireless device may be busy when subsequent paging indicators are arriving. The wireless device may continue to detect and decode these subsequent paging indicators (such as the paging indicators 120 and 121). A block 140 can be illustrative of operations taken by the wireless device in processing the paging indicator 122.

Figure 2:
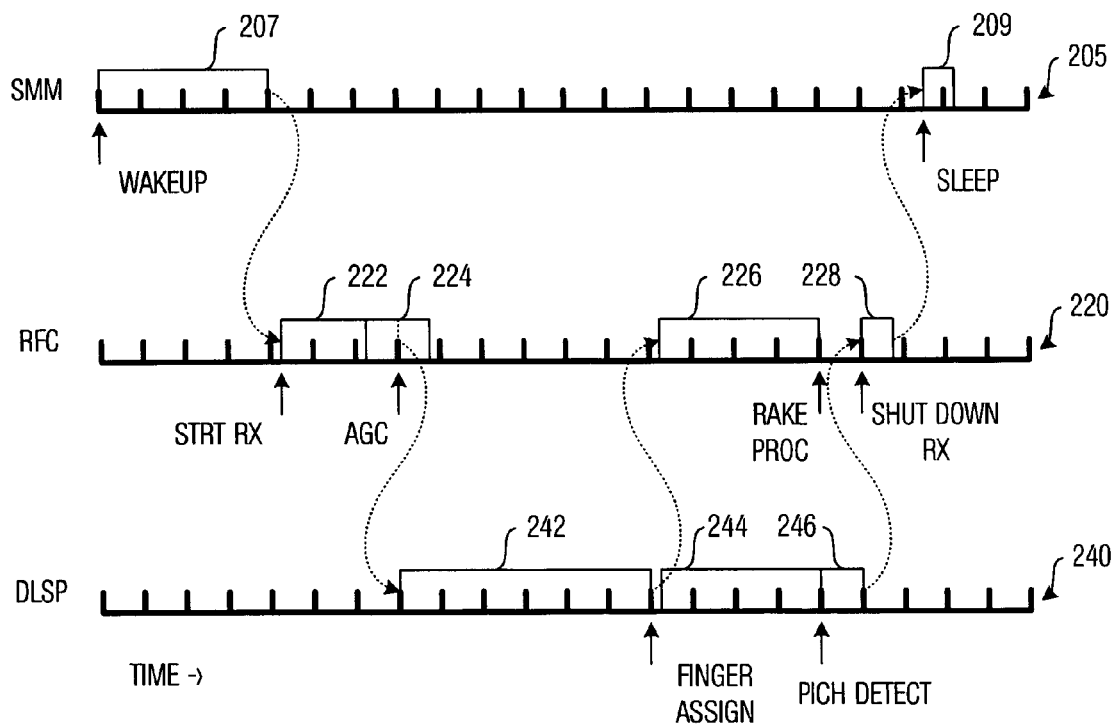
FIG. 2 is a detailed view of exemplary operations performed by a wireless device to detect and decode a paging indicator.

With reference now to FIG. 2, there is shown a diagram illustrating an exemplary view of the operations performed by a wireless device to detect and decode a paging indicator. A first axis 205 can display operations taken by the wireless device's sleep mode manager (SMM), a second axis 220 can display operations taken by the wireless device's radio frequency controller (RFC) which can be used to control radio frequency circuitry in the wireless device, and a third axis 240 can display operations taken by the wireless device's downlink slot processor (DLSP) which is responsible for detecting and decoding received transmissions.

At a time that may be some period of time before an expected arrival of a paging indicator, the SMM may begin to wake up the wireless device. The operations involved in waking up the wireless device may include but are not limited to restoring saved state, turning on an internal clock, making adjustments to the internal clock to compensate for the time spent sleeping, preparing radio frequency circuits and other hardware to receive transmitted signals, and so forth. The operations performed by the SMM for waking up the wireless device are shown as block 207. Once the SMM wakes up the wireless device, the RFC can begin receiving transmissions. This can be done by turning on (or starting) the receive circuitry (displayed as block 222). Part of the starting of the receive circuitry may involve tuning or training the receive circuitry to optimize performance to current communications channel conditions. The RFC may also turn on and prepare for use an automatic frequency control digital-to-analog converter (AFCDAC), displayed as block 224. Part of the preparation of the AFCDAC may involve tuning and locking an automatic gain control (AGC) circuit.

With the AGC locked, the DLSP can begin processing the received signal to characterize the communications channel and to determine the delay spread of the communications channel. With the delay spread determined, the DLSP can take advantage of any multipath present in the received signal to improve the quality of the received signal. The operations of the DLSP to characterize the communications channel can be displayed as block 242. With the presence of any multipath determined, the DLSP may assign fingers of a rake receiver to each path in the multipath. The use of a rake receiver to combine multipath signals is considered to be well understood by those of ordinary skill in the art of the present invention.

With the fingers of the rake receiver assigned, RFC can perform a frequency error estimation by using the AFC (block 226). The amount of time spent to estimate the frequency error can be dependent upon the convergence speed of the AFC and the magnitude of the frequency error. Operating at the same time as the AFC, the DLSP can perform an estimate of the communications channel gains and a detection of the paging indicator (block 244). After the paging indicator is detected, it can be decoded (block 246). While the paging indicator is being detected, a rake processor (RAKE PROC) may begin operations, which can include buffereing CPICH and PICH symbols. As displayed in FIG. 2, the paging indicator detected tells the wireless device to go back to sleep. The RFC shuts down the radio frequency circuitry (block 228) while the SMM places the wireless device back to sleep (block 209). Note that the SMM may not begin putting the wireless device to sleep until the RFC has shut down the radio frequency circuitry (block 228).

The probability of a wireless device miss detecting a paging indicator may be expressed mathematically as:

$$P_{m-p}=1-(1-P_{fail\_reacq})(1-P_{fail\_DPE})(1-P_{TFC})(1-P_{PCH})(1-P_{PICH})$$

wherein $P_{fail\_reacq}$ is the probability of error due to real-time clock (RTC) calibration error, $P_{fail\_DPE}$ is the probability of a missed paging indicator due to a searcher error, $P_{TFC}$ is the probability of a missed paging indicator due to a transport format combination (TFC) decoding error, $P_{PCH}$ is the frame error rate (FER) of the paging channel assuming a perfect delay profile estimation (DPE), successful reacquisition, transport format combination indicator (TFCI) decoding and correct paging indicator channel (PICH) detection, and $P_{PICH}$ is the probability of a PICH detection error when there is a paging indication for the wireless device. In a static (stationary wireless device) with a 1.5 dB margin, $P_{m-p}$ is approximately 0.6%, according to 3GPP technical standards, with the $P_{PICH}$ being the dominant contributor. Since $P_{PICH}$ is the dominant contributor to the miss detection of a paging indicator, it can be a good candidate for improvement.

As discussed previously, a major contributing factor to a wireless device having a detection error for the paging indicator may be a frequency difference between the carrier frequency of the transmitted signal and the frequency in the wireless device. The frequency error may be due to several factors, such as temperature induced drifting, low quality components with loose tolerances, clock drift, the wireless device being in motion, etc. The larger the frequency error, the greater the probability of the wireless device having a detection error of the paging indicator.

Figure 3:
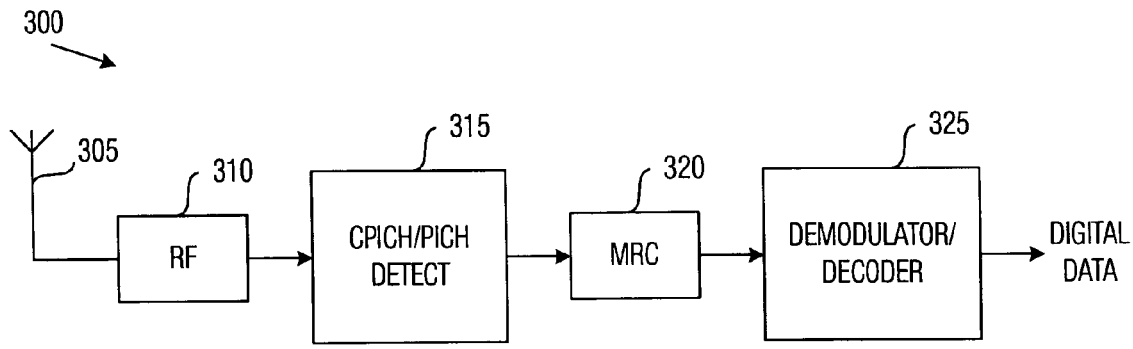
FIG. 3 is a diagram of a portion of a wireless device with a paging indicator detector.

With reference now to FIG. 3, there is shown a diagram illustrating a portion of a wireless device 300 with a paging indicator detector using a vector-based frequency error estimator, according to a preferred embodiment of the present invention. Note that the portion of the wireless device 300 displayed in FIG. 3 shows the radio frequency (RF) portion of the wireless device 300 along with a portion of the circuitry responsible for decoding and demodulating the received signal. Portions of the wireless device 300 that may be responsible for digitally processing the received signal, such as error detection and correction, deinterleaving, user interface peripherals, and any device that may be coupled to the wireless device 300 to make use of the received data, and so forth are not shown in FIG. 3.

An antenna 305 can be used to receive the signal that is transmitted over-the-air to the wireless device 300. The antenna 305 may provide the received signal to a radio frequency (RF) section 310 that may perform tasks such as filtering and amplifying the received signal to help reduce out-of-band noise and to bring the signal level to a level that is compatible with circuitry in the remainder of the wireless device 300. An analog-to-digital converter (not shown) may be used to convert the received signal, which may be in an analog form, into digital symbols that are suitable for processing. The digital symbols can then be provided to a paging indicator and common pilot channel detect unit (CPICH/PICH detect) 315.

The CPICH/PICH detect 315 can be used to detect the presence of the paging indicator. According to a preferred embodiment of the present invention, the CPICH/PICH detect 315 can make use of a frequency error estimation to generate a correction vector that may be used to correct any frequency error existing between the received signal and the wireless device 300. The operation of the CPICH/PICH detect 315 will be discussed in greater detail below.

Output from the CPICH/PICH detect 315 may then be provided to a maximum ratio combiner (MRC) 320. The MRC 320 can be used to combine the multiple paging indicators (as a result of multipath and rake receiver fingers assigned to each multipath) according to a weight given to each multipath. For example, a paging indicator associated with a multipath that is determined to be a powerful path may be assigned a large weight (significance) while a paging indicator associated with a multipath that is determined to be a weak path may be assigned a small weight (significance). The various paging indicators can then be combined based on their assigned weights. Other algorithms may be used to combine the paging indicators, such as equal gain combining, wherein each paging indicator may be combined with equivalent weight, meaning that no paging indicator is given more significance than any other. The combined paging indicator can then be provided to a demodulator/decoder 325 wherein it can be demodulated and then decoded. After decoding, the decoded paging indicator may be used to determine if the wireless device 300 can return to sleep mode or if it needs to process additional information to receive an incoming call, page, etc.

Figure 4:
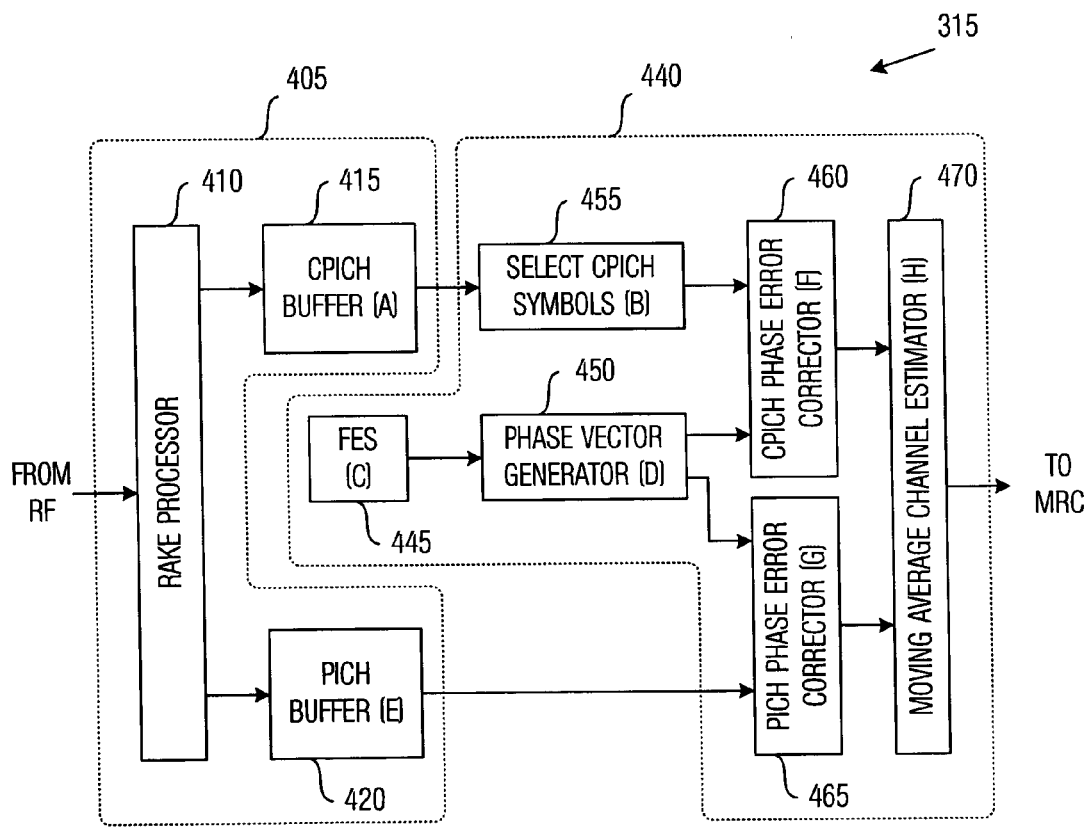
FIG. 4 is a diagram of a CPICH/PICH detect circuit, according to a preferred embodiment of the present invention.

With reference now to FIG. 4, there is shown a diagram illustrating the CPICH/PICH detect 315, according to a preferred embodiment of the present invention. The CPICH/PICH detect 315 can be partitioned into two components, a hardware portion 405 and a radio frequency control (RFC) portion 440. The RFC portion 440 may be software and/or firmware routines that can be used to process the received signal. Note that portions of the RFC portion 440 may be alternatively implemented in hardware should the need arise for additional performance.

The hardware portion 405 consists of a rake processor 410, a CPICH buffer 415, and a PICH buffer 420. The rake processor 410 can receive as input the digital symbols from an analog-to-digital converter (not shown) that converts the received signal provided by RF circuitry (not shown) into its digital representation. The rake processor 410 can be used to assist in the correlating of the received signals with specific pseudo-random number (PN) sequences. For example, the paging indicator (PICH) may have been spread with a unique PN sequence prior to transmission to help keep it from interfering with other signals being transmitted. Typically, different channels will use different PN sequences to prevent interference. After correlation in the rake processor 410, CPICH and PICH symbols can be buffered in the CPICH buffer 415 and the PICH buffer 420 respectively.

While the rake processor 410 is providing the CPICH and PICH symbols, a frequency error estimator (FES) 445 can begin operation to estimate the frequency error. Detailed discussion of the estimation of the frequency error is provided below. Due to the algorithm used in the estimation of the frequency error, a selected number of CPICH symbols may be selected and stored by a select CPICH symbols block 455. Then, based on the estimated frequency error, a phase vector generator 450 can compute a vector that can be used to correct for the frequency error. The vector may be provided to a CPICH phase error corrector 460 and a PICH phase error corrector 465. The frequency error corrected CPICH and PICH symbols may then be provided to a moving average channel estimator 470, which effectively estimates channels gains for each PICH symbol using a sliding window FIR (finite impulse response) filter and then applies the channel gains to the frequency error corrected PICH symbol and sums the results. The summed result may be the decoded paging indicator.

Figure 5:
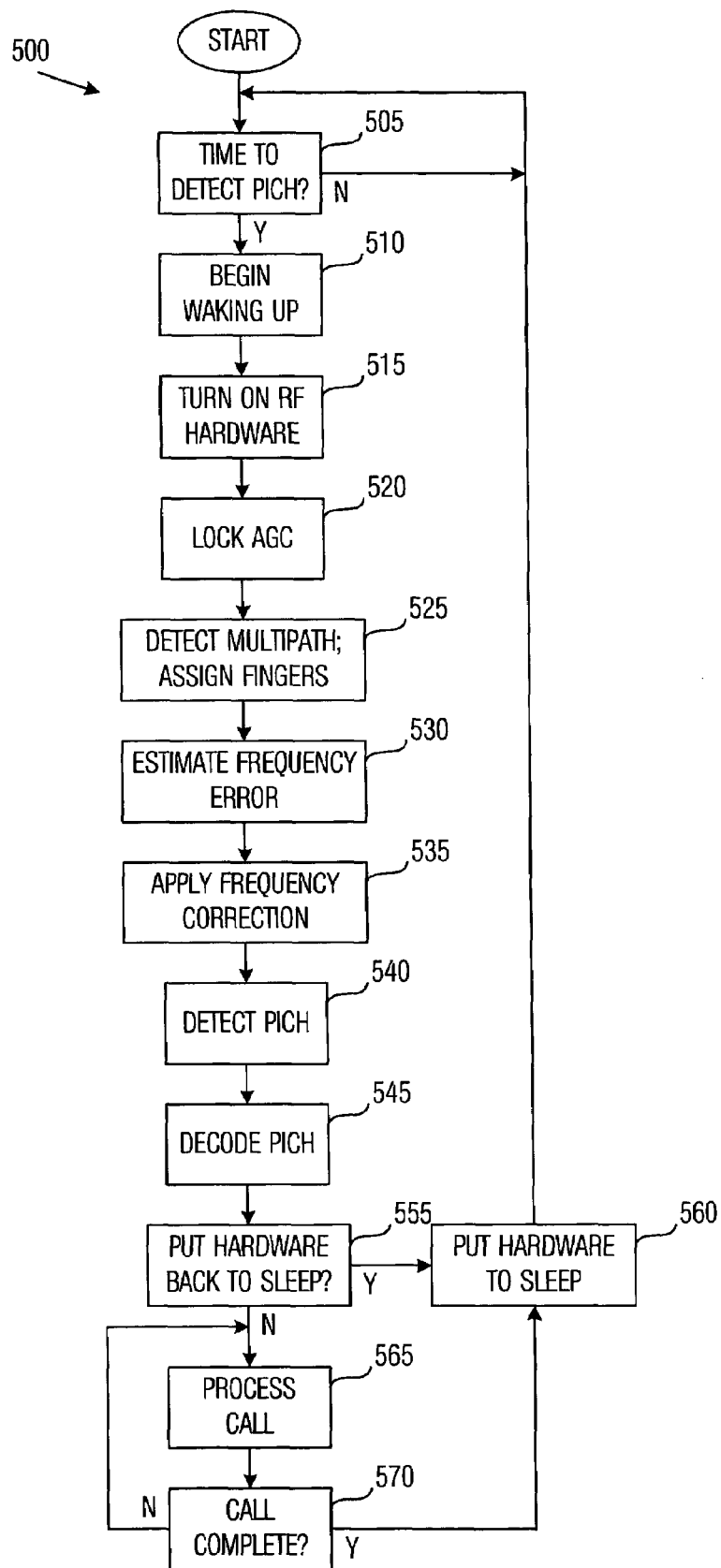
FIG. 5 is a flow diagram of a sequence of operations that may be taken by a wireless device to detect and decode a paging indicator, according to a preferred embodiment of the present invention.

With reference now to FIG. 5, there is shown a flow diagram illustrating a sequence of operations 500 that may be taken by a wireless device to detect and decode a paging indicator, according to a preferred embodiment of the present invention. The wireless device may configure itself to wake up a period of time prior to the expected arrival time of a paging indicator. This may be accomplished by periodically checking an internal clock to determine if it is time to detect the paging indicator (PICH) (block 505). If it is not time, then the wireless device can remain in sleep mode and wait for the time to arrive. If it is time to detect the paging indicator, then the wireless device can begin its wake up procedure (block 510). Alternatively, a wake-up interrupt can be programmed into a timer and when the time arrives to wake up, the timer can go off and wake up the wireless device.

The wireless device can then turn on radio frequency hardware (block 515). This can be followed by locking automatic gain control (AGC) circuitry (block 520). With the radio frequency hardware turned on and the AGC locked, the wireless device can then perform a delay spread estimation of the communications channel (block 525). The delay spread estimation can provide information about the existence and location of multipath (if multipaths exist) and can be used to assign rake receiver fingers. Once the rake receiver fingers are assigned, the wireless device can begin receiving transmitted signals, and, from the received signals, the wireless device can estimate a frequency error (block 530).

The estimated frequency error can be used to correct the received signal (block 535). The wireless device can then use the corrected received signal to detect (block 540) and then decode (block 545) the paging indicator. Based on the value of the decoded paging indicator (block 555), the wireless device can be placed back to sleep (block 560) or it may continue processing to handle an incoming call, page, etc. (block 565). Once the incoming call is complete (block 570), the hardware can be put to sleep, where it can wait for the next paging indicator. If the incoming call is not complete, the wireless device can continue to process the incoming call (block 565).

Figure 6:
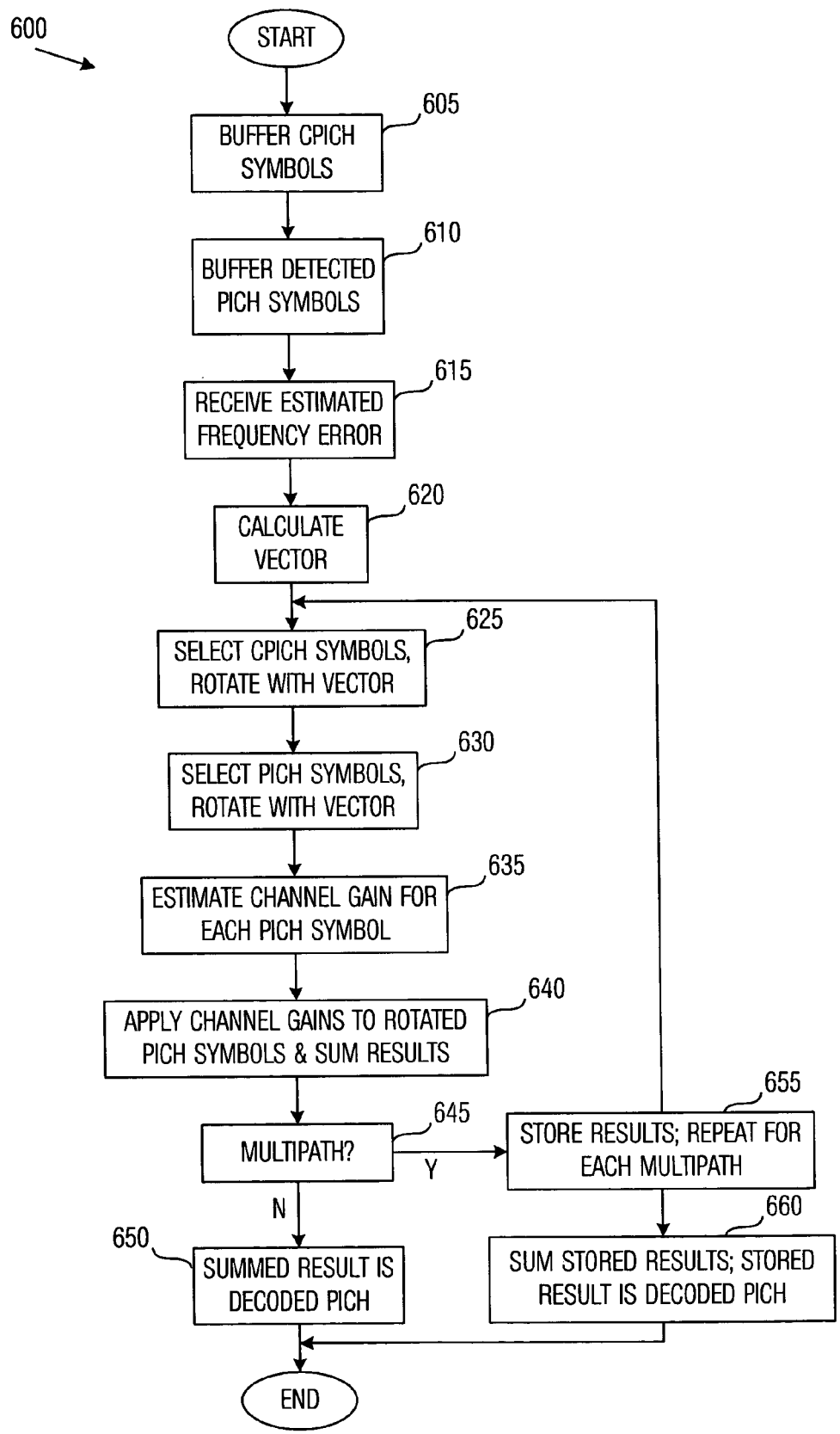
FIG. 6 is a flow diagram of an algorithm that can be used to correct received PICH and CPICH symbols using a calculated frequency error estimate and then decode paging indicators, according to a preferred embodiment of the present invention.

With reference now to FIG. 6, there is shown a flow diagram illustrating an algorithm 600 that can be used to correct received PICH and CPICH symbols using a calculated frequency error estimate and then to decode paging indicators, according to a preferred embodiment of the present invention. According to a preferred embodiment of the invention, the algorithm 600 may execute in the RFC of a wireless device. Alternatively, the algorithm 600 may execute in a processing element located in the wireless device.

The algorithm 600 begins with the buffering of CPICH (common paging channel) symbols (block 605). According to a preferred embodiment of the present invention, a sufficient number of consecutive CPICH symbols are buffered to ensure that the CPICH symbols span an interval of paging indicators used in the algorithm 600. Then, PICH symbols are buffered as they are detected (block 610).

Figure 7:
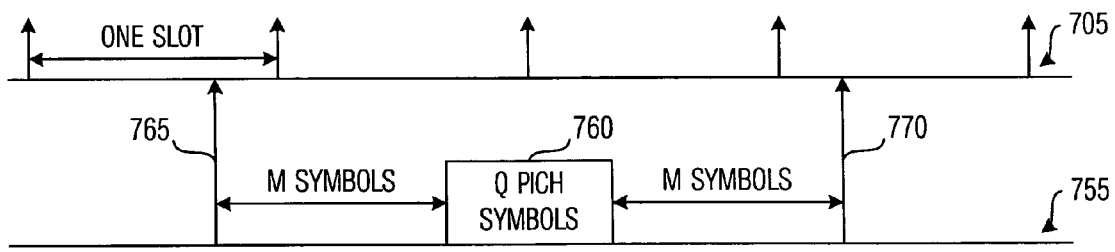
FIG. 7 is a diagram showing the relationship between CPICH and PICH symbols used by the algorithm in FIG. 6, according to a preferred embodiment of the present invention.

With reference now to FIG. 7, there is shown a diagram illustrating the relationship between CPICH and PICH symbols being used in the algorithm 600 (FIG. 6), according to a preferred embodiment of the present invention. A first axis 705 illustrates the CPICH channel while a second axis 755 illustrates the PICH channel. On the second axis, a block 760 illustrates a group of Q PICH symbols while two vertical lines 765 and 770 span a region of CPICH symbols on the CPICH channel (axis 705) that may be used to estimate the channel gains for the Q PICH symbols. Note that the two vertical lines 765 and 770 may span a total of 2M+Q PICH symbols, wherein M is an integer number.

With reference back now to FIG. 6, the RFC of the wireless device may now receive an estimated frequency error (block 615). The determination of the estimated frequency error may be determined as follows: at an i-th CPICH symbol from an output of the rake processor 410 (FIG. 4) for the channel estimation can be expressed mathematically as:

$$y_c(i) = \hat{h}(i)e^{j(2\pi f_e i T_s + \theta_0)} + n_c(i)$$
$$= \hat{h}(i)e^{j\theta_0}e^{j2\pi f_e i T_s} + n_c(i)$$
$$= h(i)e^{j2\pi f_e i T_s} + n_c(i)$$

wherein $\hat{h}(i)$ can represent all except the phase terms due to the phase error and the initial phase term $\theta_0$ due to the zero phase reference point, $h(i)$ includes all except the phase terms due to the frequency error, $n_c(i)$ includes all noise terms, and $T_s$ represents the symbols length of one CPICH symbol. For all i-th PICH symbol to be detected, $$y_p(i) = \hat{g}(i)e^{j(2\pi f_e(M+i)T_s + \theta_0)} + n_p(i)$$
$$= \hat{g}(i)e^{j\theta_0}e^{j2\pi f_e(i+M)T_s} + n_p(i)$$
$$= g(i)e^{j2\pi f_e(i+M)T_s} + n_p(i)$$

wherein $\hat{g}(i)$ represents all except the phase terms due to the phase error and the initial phase term $\theta_0$, $g(i)$ includes all except the phase terms due to the frequency error, $n_p(i)$ includes all noise terms. Note that $$\hat{h}(i) \propto \hat{g}(i).$$

From $y_c(i)$, $\hat{f}_e$ can be estimated through a variety of different methods. For example, the well know differential method can be used to estimate $\hat{f}_e$. However, the open loop approach wherein no feedback is required is preferred, since there is no feedback control as in a conventional AFC wherein a large amount of time may be needed to reduce the frequency error to a certain level.

According to a preferred embodiment of the present invention, the FES 445 (FIG. 4) may be responsible for estimating the frequency error. The frequency error estimate may be computed after the FES 445 has received NUM_SLOT_FREQ slots of CPICH symbols, with the count beginning after the end of delay profile estimation (DPE). The specific value of NUM_SLOT_FREQ can vary, with possible values ranging from one (1) and up. According to a preferred embodiment of the present invention, a preferred value for NUM_SLOT_FREQ may be three (3). Note that the value of NUM_SLOT_FREQ can have an effect on the speed of the convergence (how quickly the frequency error can be reduced), with the smaller the value of NUM_SLOT_FREQ tending to provide faster convergence. However, larger values of NUM_SLOT_FREQ tend to result in better performance in terms of standard deviation and root-mean squared error.

With the estimated frequency error, the RFC can now calculate a vector (block 620) that can be used to correct the CPICH and PICH symbols. Let $\hat{f}_e$ represent the estimated frequency error from FES 445 (FIG. 4). The phase error generator 450 (FIG. 4) can generate a row vector to correct those CPICH symbols used for the channel estimation for all PICH symbols $$w_c = [1 e^{-j2\pi \hat{f}_e T_s}, \ldots e^{-j2\pi \hat{f}_e (2M+Q-1) T_s}]_{(2M+Q) \times 1}.$$

Also, the phase error generator 450 can also generate the following phase correction term for all PICH symbols $$w_p = \left[ e^{-j2\pi \hat{f}_e M T_s} \quad e^{-j2\pi \hat{f}_e (M+1) T_s} \quad \ldots \quad e^{-j2\pi \hat{f}_e (M+Q) T_s} \right]_{Q \times 1}.$$

Note that since the elements of $w_p$ are contained in $w_c$, only $w_c$ needs to be calculated and $w_p$ can be selected from $w_c$.

The value $e^{-j2\pi \hat{f}_e k T_s}$ can be calculated either using a look-up table or via an on-line calculation. The look-up table implementation is relatively straight forward and is made up of tables of values stored in memory. The on-line implementation can be performed as follows. Since $w = [1 e^{jx} \ldots e^{j(K-1)x}]$, wherein K is the vector size, notice that $$e^{jmx} = \cos(mx) + j \sin(mx) \quad (a)$$

and $\cos(mx) = \cos((m-1)x)\cos x - \sin((m-1)x)\sin x$ (b)

and $\sin(mx) = \sin((m-1)x)\cos x + \cos((m-1)x)\sin x.$ (c)

Therefore, the phase rotation vectors can be recursively calculated. The recursive algorithm is as follows:

1. Calculate $\cos(x)$ by use of polynomial fittings or look-up tables.

2. Calculate $\sin(x)$ by use of polynomial fittings or look-up tables or the relationship $\sqrt{1 - \cos^2(x)}$.

3. Use relationships (a), (b), and (c) above to recursively calculate $e^{j2x}, e^{j3x}, \ldots$ and $e^{j(K-1)x}$.

Alternatively, the phase rotation vectors can be calculated using the following recursive algorithm:

1. Calculate $\cos(x)$ by use of polynomial fittings or look-up tables.

2. Calculate $\sin(x)$ by use of polynomial fittings or look-up tables or the relationship $\sqrt{1 - \cos^2(x)}$.

3. Calculate $e^{jx}$ from the steps 1 and 2.

4. Calculate $e^{j2x}$ by squaring the results from the step 3.

5. Calculate $e^{j3x}$ by multiplying the results from the steps 3 and 4.

6. Recursively calculate $e^{j4x}$ and so forth.

With the vector calculated, the RFC can correct the CPICH and PICH symbols. The RFC may select CPICH symbols that are to be used for channel estimation and can apply the vector to the symbols to rotate their phases (block 625), with the phase rotated CPICH symbols being expressible as $\hat{y}_c(m) = w_c(m) y_c(m)$. The RFC can do the same to the PICH symbols (block 630). After correcting the CPICH and PICH symbols, the RFC can estimate the channel gains for the PICH symbols via the application of a sliding window FIR (finite impulse response) filter (block 635). The channel estimate for the i-th PICH symbol can be expressed as:

$$u(i) = \sum_{m=0}^{2M} w_c(m) y_c(m+i) = \sum_{m=0}^{2M} \hat{y}_c(m+i),$$

while the i-th phase rotated PICH symbols are expressible as $\hat{y}_p(i) = w_p(i) y_p(i)$.

The RFC may then apply the calculated channel gains to the phase rotate PICH symbols and sum up the results (block 640). If there is no multipath, then the results of block 640 may be the decoded paging indicator. If there is a multipath (block 645), then the RFC repeats blocks 625 through 640 for each multipath and the results are combined to form the decoded paging indicator (block 660). If there is no multipath, then the summed results is the decoded PICH symbol (block 650). The decoded paging indicator can be compared to a value, such as a zero (0), to determine if there is an incoming call, page, etc. for the wireless device. For example, if the decoded paging indicator is greater than zero, then there is an incoming call, and if the decoded paging indicator is less than zero, then there is not an incoming call.

Figure 8:
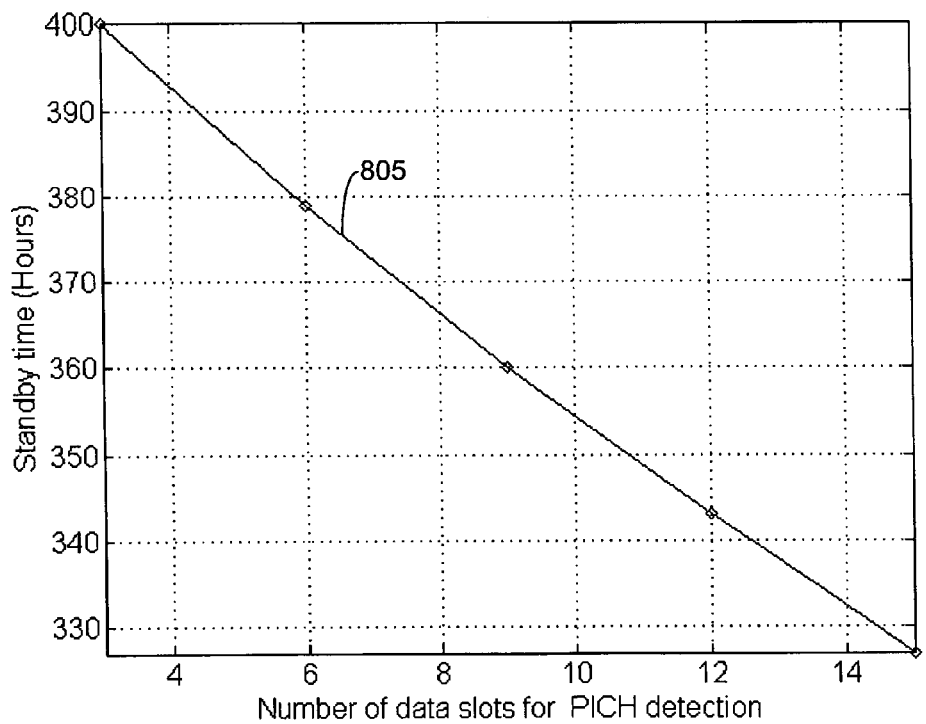
FIG. 8 is a data plot of wireless device standby time as a function of the number of data slots used for PICH detection, according to a preferred embodiment of the present invention.

With reference now to FIG. 8, there is shown a data plot illustrating wireless device standby time as a function of the number of data slots used for PICH detection, according to a preferred embodiment of the present invention. The data plot displays a curve 805 that illustrates that as the number of data slots used for PICH detection increases, the standby time for the wireless device decreases. Note that the relationship appears to be relatively linear.

Figure 9A:
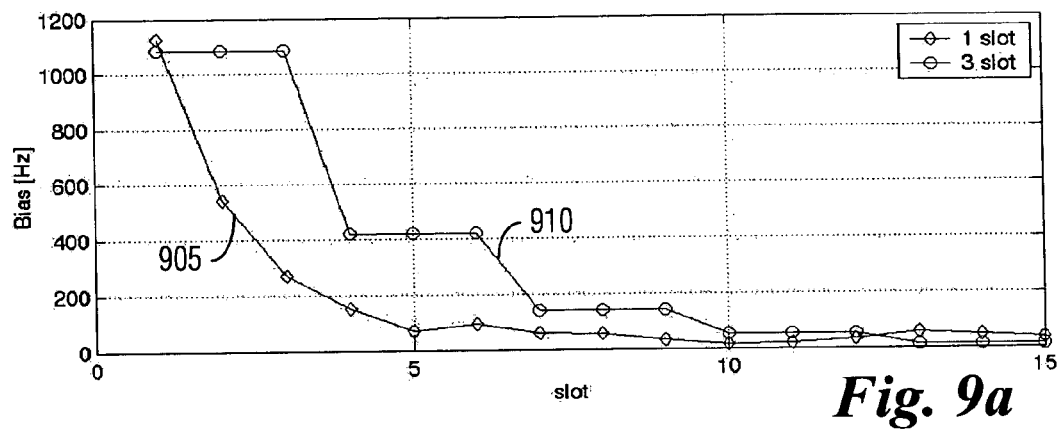
FIGS. 9a through 9c are data plots comparing the performance difference between one and three slot update rates for a closed loop AFC.
Figure 9B:
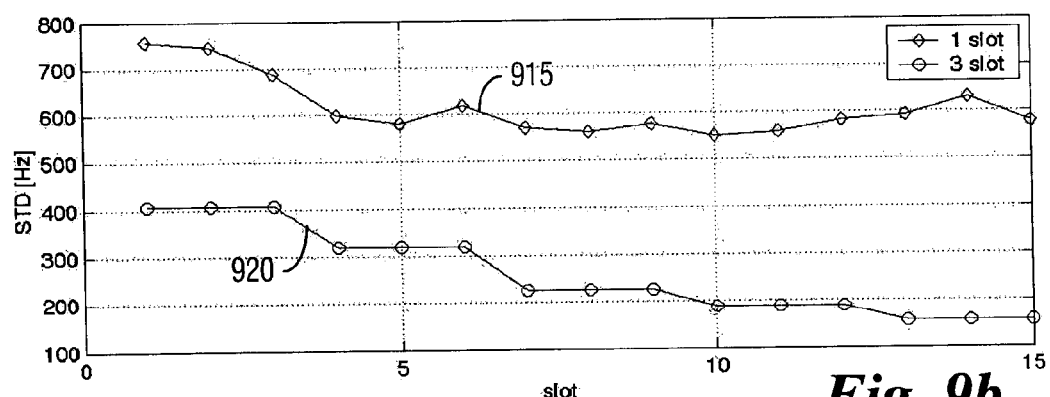
Figure 9C:
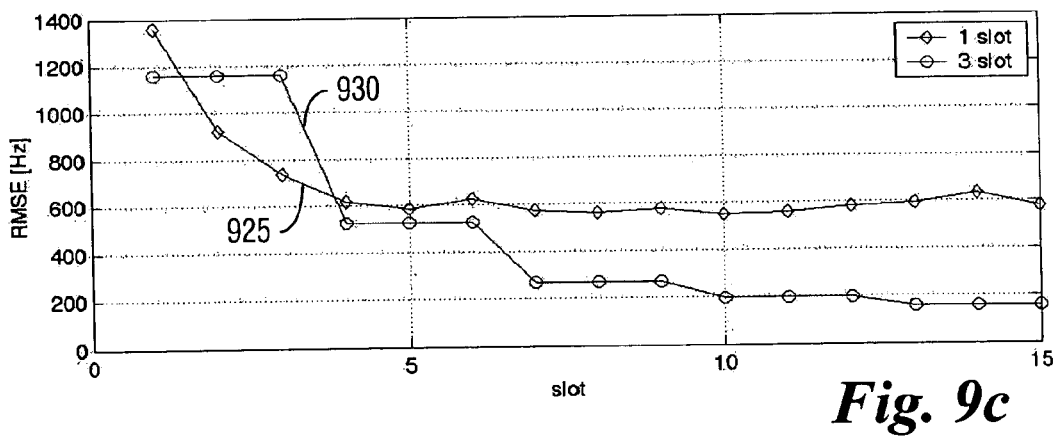

With reference now to FIGS. 9a through 9c, there are shown data plots illustrating the performance difference between a closed loop AFC using one and three slot update rates. FIG. 9a displays convergence (bias) in hertz, while FIG. 9b displays standard deviation, and FIG. 9c displays root mean square error (RMSE). From these figures, it is clear that a fast update (1 slot) gives a faster convergence (a first curve 905) when compared to a slower update (3 slots) (displayed as a second curve 910) at the sacrifice of performance (a larger standard deviation and a larger RMSE). However, a third and fifth curves 915 and 925 show that the fast update (1 slot) results in poorer performance than a fourth and sixth curves 920 and 925 when it comes to standard deviation and RMSE.

Figure 10:
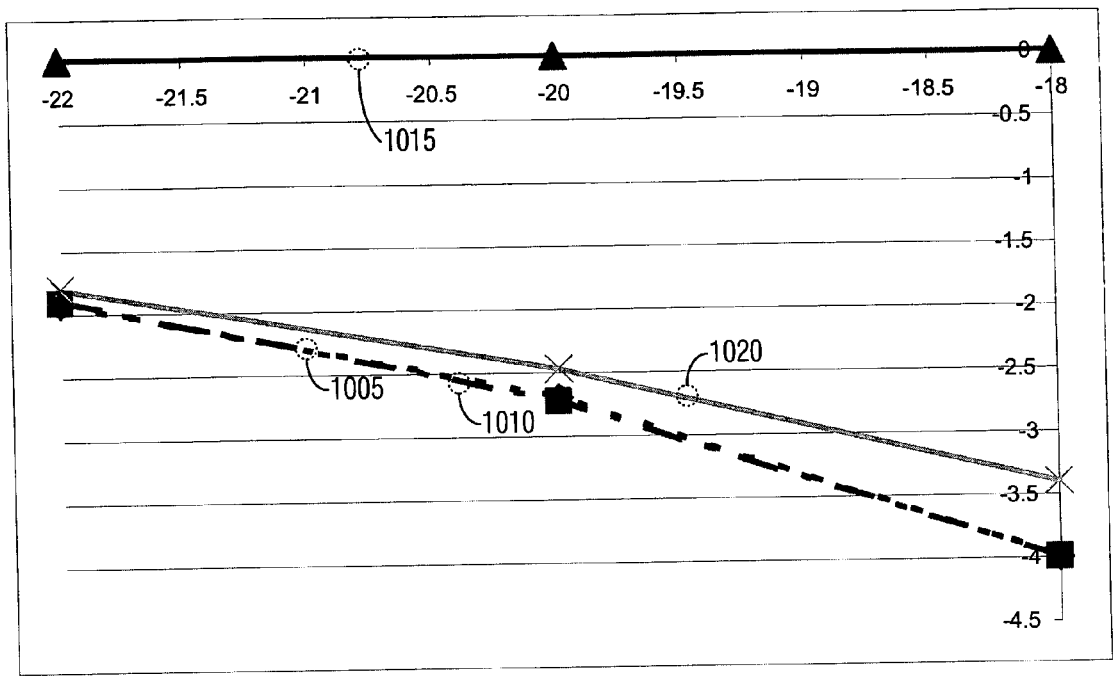
FIG. 10 is a data plot illustrating a comparison of performance for a conventional frequency error estimation technique and the present invention in a stationary wireless device situation, according to a preferred embodiment of the present invention.

With reference now to FIG. 10, there is shown a data plot illustrating a comparison of the performance for a conventional frequency error estimation technique and the present invention in a stationary wireless device situation, according to a preferred embodiment of the present invention. The data plot displays a calculated PICH BER (in percentage) for a given PICH Ec/Ior in dB for cases with a frequency error of 0 ppm and 0.5 ppm. The parameters of a simulation used to generate the data are according to 3GPP technical standards TS 25.101. Note that the losses for the present invention are less than 0.3 dB in a frequency error of 0 ppm case. However, the conventional technique fails to detect PICH symbols for frequency errors greater than 0.4 ppm (note that the 0.4 ppm case was simulated but not plotted in FIG. 10).

A first and third curve 1005 and 1015 displays the performance using the conventional technique while a second and fourth curve 1010 and 1020 displays the performance using a preferred embodiment of the present invention. Note that for the 0.0 ppm case, the performance of old technique and a preferred embodiment of the present invention are essentially similar and the first and second curves 1005 and 1010 lay on top of one another. The table below displays the data illustrated in the data plot in numerical form. Note that the columns labeled "Old" represent data for the conventional technique and columns labeled "New" represent data for a preferred embodiment of the present invention.

| Ec/Ior | 0 ppm | | 0.5 ppm | |
|---|---|---|---|---|
| (dB) | Old | New | Old | New |
| −22 | 1.21 | 1.22 | 99.96 | 1.57 |
| −20 | 0.20 | 0.19 | 99.71 | 0.34 |
| −18 | 0.01 | 0.01 | 98.73 | 0.04 |

Figure 11:
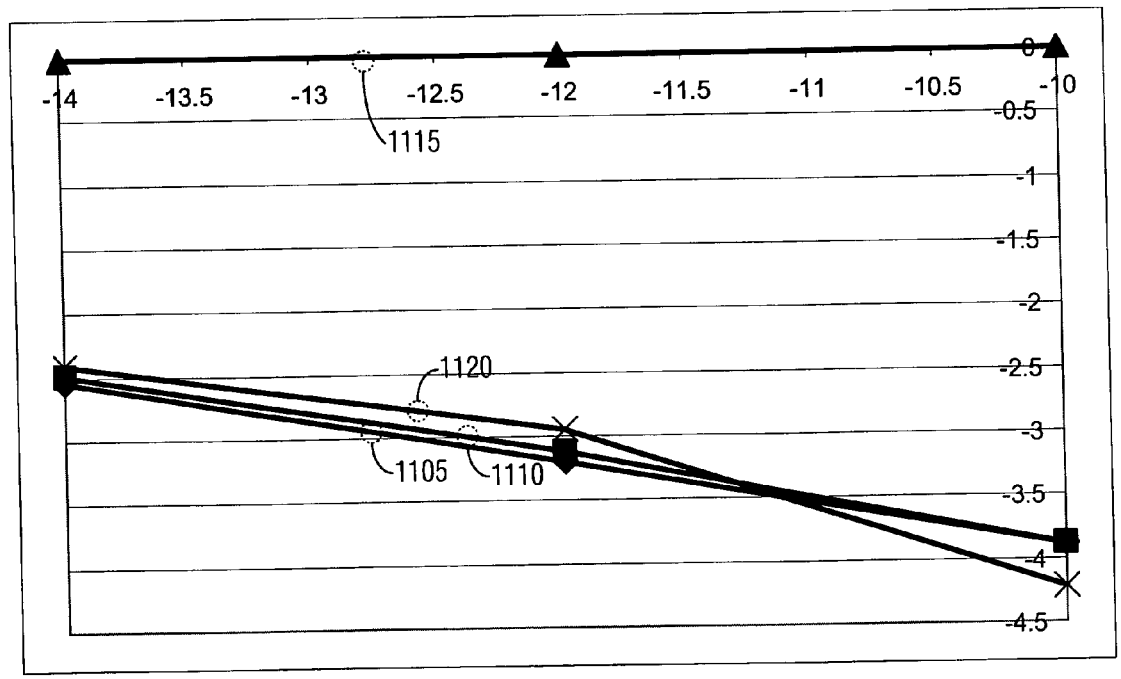
FIG. 11 is a data plot illustrating a comparison of performance for a conventional frequency error estimation technique and the present invention in a moving wireless device situation, according to a preferred embodiment of the present invention.

With reference now to FIG. 11, there is shown a data plot illustrating a comparison of the performance for a conventional frequency error estimation technique and the present invention in a moving wireless device situation, according to a preferred embodiment of the present invention. The data plot displays a calculated PICH BER (in percentage) for a given PICH Ec/Ior in dB for cases with a frequency error of 0 ppm and 0.7 ppm.

A first and third curve 1105 and 1115 displays the performance using the conventional technique while a second and fourth curve 1110 and 1120 displays the performance using a preferred embodiment of the present invention. Note that for the 0.0 ppm case, the performance of old technique and a preferred embodiment of the present invention are essentially similar and the first and second curves 1005 and 1010 lay close one another. The table below displays the data illustrated in the data plot in numerical form. Note that the columns labeled "Old" represent data for the conventional technique and columns labeled "New" represent data for a preferred embodiment of the present invention.

| Ec/Ior | 0.0 ppm | | 0.7 ppm | |
|---|---|---|---|---|
| (dB) | Old | New | Old | New |
| −14 | 0.281 | 0.319 | 60.26 | 0.400 |
| −12 | 0.063 | 0.075 | 61.14 | 0.113 |
| −10 | 0.013 | 0.013 | 61.67 | 0.006 |

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for detecting a symbol in a digital system with a symbol detector comprising the steps of:
   receiving and buffering input symbols of a first and second type in the symbol detector;
   computing an estimated frequency error from the symbols;
   computing a phase rotation vector based on the estimated frequency error;
   rotating buffered symbols of the first and second type via the vector;
   computing a channel gain for the buffered symbols of the second type;
   applying the channel gain to the rotated buffered symbols of the second type;
   summing results of the applying step; and
   wherein the symbol is detected when there are frequency errors in the digital system.

2. The method of claim 1, wherein the symbols of the first type are common paging channel (CPICH) symbols and the symbols of the second type are paging indicator (PICH) symbols.

3. The method of claim 2, wherein a paging indicator may comprise a plurality of paging indicator symbols.

4. The method of claim 1 further comprising before the receiving:
   buffering symbols of the first type; and
   buffering symbols of the second type as they are detected.

5. The method of claim 4, wherein an integer number of transmission slots of symbols of the first type are buffered.

6. The method of claim 5, wherein the integer number is three (3).

7. The method of claim 4, wherein the number of symbols of the first type spans a time span that is greater than a time span covered by the number of symbols of the second type that are buffered.

8. The method of claim 7, wherein the number of symbols of the second type buffered is twelve (12).

9. The method of claim 1 wherein the estimated frequency error can be determined from an i-th symbol of the first type based on a mathematical expression as follows:
   wherein can represent all except the phase terms due to the phase error and the initial phase term due to the zero phase reference point, includes all except the phase terms due to the frequency error, includes all noise terms, represents the symbols length of one CPICH symbol, and is the estimated frequency error.

10. The method of claim 1 wherein the estimated frequency error can be determined from an i-th symbol of the second type based on a mathematical expression as follows:
   wherein represents all except the phase terms due to the phase error and the initial phase term, includes all except the phase terms due to the frequency error, includes all noise terms, and is the estimated frequency error.

11. The method of claim 1 wherein the result of the summing is a decoded paging indicator.

12. The method of claim 1, wherein the symbols of the first and second types are transmitted over-the-air, wherein multipath reception of the symbols exists, and the method further comprising:

repeating the rotating, estimating, applying, and summing for each path in the multipath; and combining the summed results for each path in the multipath.

13. The method of claim 12, wherein the combined result is a decoded paging indicator.

14. The method of claim 1, wherein two vectors are calculated, with one vector for each symbol type.

15. The method of claim 14, wherein a first vector for use with symbols of the first type can be computed from the estimated frequency error using the following expression:

wherein is the estimated frequency error, Q is the number of symbols of the second type buffered, and 2M+Q is the number of symbols of the first type buffered.

16. The method of claim 14, wherein a second vector for use with symbols of the second type can be computed from the estimated frequency error using the following expression:

wherein is the estimated frequency error, Q is the number of symbols of the second type buffered, and 2M+Q is the number of symbols of the first type buffered.

17. The method of claim 1, wherein the estimating comprises multiplying the vector with the buffered symbols of the first type.

18. The method of claim 17, wherein the channel estimate for an i-th buffered symbol of the first type can be expressed as:

wherein yc(m) is the m-th buffered symbol of the first type and wc(m) is the m-th term of the vector, and 2M is the number of buffered symbols of the first type.

19. The method of claim 1, wherein the applying comprises multiplying the estimated channel gain with each buffered symbol of the second type after being rotated.

20. The method of claim 1, wherein the summing comprises summing the result of the multiplication of the estimated channel gain with each buffered symbol of the second type, with the summing expressible as:

wherein u(m) is the m-th term of the estimated channel gain, is the m-th buffered symbol of the second type after being rotated, and Q is the number of buffered symbols of the second type.

21. A symbol detector comprising:

a first and a second symbol buffer coupled to a symbol input;

a frequency error estimator (FES) unit coupled to the first and second buffers, the FES unit containing circuitry to compute a frequency error estimate from the symbols in the first and second buffers;

a phase vector generator coupled to the FES unit, the phase vector generator containing circuitry to compute a phase rotation vector based on the frequency error estimate;

a first phase error corrector coupled to the first symbol buffer and the phase vector generator, the first phase error corrector containing circuitry to rotate the symbols in the first symbol buffer; and a second phase error corrector coupled to the second symbol buffer and the phase vector generator, the second phase error corrector containing circuitry to rotate the symbols in the second symbol buffer, compute a channel gain for each symbol in the second symbol buffer, and apply the channel gain to the rotated symbols from the second symbol buffer.

22. The symbol detector of claim 21 further comprising a channel estimator coupled to the first and the second phase error correctors, the channel estimator containing circuitry to combine the rotated symbols from the second symbol buffer after the application of the channel gain.

23. The symbol detector of claim 22, wherein the symbols in the first symbol buffer are paging channel symbols and the symbols in the second symbol buffer are paging indicator symbols, and wherein the channel estimator produces a decoded paging indicator.

24. The wireless device of claim 21 further comprising a demodulator and decoder coupled to the combiner, the demodulator and decoder containing circuitry to remove spreading codes applied to the symbols from the RF signal input prior to their transmission and to produce digital data.

25. The wireless device of claim 21, wherein the wireless device operates in a wireless communications network that uses paging indicators to inform wireless devices of incoming calls.

26. The wireless device of claim 25, wherein the wireless communications network is a 3rd Generation Partnership Project (3GPP) compliant network.

27. The wireless device of claim 25, wherein the wireless communications network is a CDMA2000 compliant network.

28. A wireless device comprising:

a radio frequency (RF) signal input;

a symbol detector coupled to the RF signal input, the symbol detector containing circuitry to calculate a frequency error estimate based upon symbols from the RF signal input and to correct frequency errors in symbols from the RF signal input using the calculated frequency error estimate via mathematical manipulations; and a combiner coupled to the symbol detector, the combiner containing circuitry to merge output from the symbol detector based on a weight assigned to the output, wherein the symbol detector comprises:

a first and a second symbol buffer coupled to the RF signal input;

a frequency error estimator (FES) unit coupled to the first and second buffers, the FES unit containing circuitry to compute a frequency error estimate from the symbols in the first and second buffers;

a phase vector generator coupled to the FES unit, the phase vector generator containing circuitry to compute a phase rotation vector based on the frequency error estimate;

a first phase error corrector coupled to the first symbol buffer and the phase vector generator, the first phase error corrector containing circuitry to rotate the symbols in the first symbol buffer; and a second phase error corrector coupled to the second symbol buffer and the phase vector generator, the second phase error corrector containing circuitry to rotate the symbols in the second symbol buffer, compute a channel gain for each symbol in the second symbol buffer, and apply the channel gain to the rotated symbols from the second symbol buffer.

* * * * *